United States Patent
Lv et al.

(10) Patent No.: US 9,163,996 B2
(45) Date of Patent: Oct. 20, 2015

(54) READOUT CIRCUIT FOR UNCOOLED INFRARED FOCAL PLANE ARRAY

(71) Applicant: University of Electronic Science and Technology of China, Chengdu, Sichuan (CN)

(72) Inventors: Jian Lv, Sichuan (CN); Longcheng Que, Sichuan (CN); Yun Zhou, Sichuan (CN); Linhai Wei, Sichuan (CN); Yadong Jiang, Sichuan (CN)

(73) Assignee: University of Electronic Science and Technology China, Chengdu, Sichuan Province (CN)

( * ) Notice: Subject to any disclaimer, the term of this patent is extended or adjusted under 35 U.S.C. 154(b) by 0 days.

(21) Appl. No.: 14/298,920

(22) Filed: Jun. 8, 2014

(65) Prior Publication Data

US 2015/0192472 A1  Jul. 9, 2015

(51) Int. Cl.
*G01J 5/00* (2006.01)
*G01J 5/10* (2006.01)
*G01J 5/22* (2006.01)
*G01J 5/20* (2006.01)

(52) U.S. Cl.
CPC .... *G01J 5/10* (2013.01); *G01J 5/20* (2013.01); *G01J 5/22* (2013.01); *G01J 2005/106* (2013.01)

(58) Field of Classification Search
CPC ...................................... G01J 5/20; G01J 5/22
USPC ................................... 250/338.1, 338.4, 332
See application file for complete search history.

(56) References Cited

U.S. PATENT DOCUMENTS 5,756,999 A * 5/1998 Parrish et al. ............... 250/332
6,028,309 A * 2/2000 Parrish et al. ............... 250/332

* cited by examiner

*Primary Examiner* — Constantine Hannaher
*Assistant Examiner* — Meenakshi Sahu (57) ABSTRACT

A readout circuit for an uncooled infrared focal plane array includes: a first biasing circuit for generating a detection output signal; a second biasing circuit for generating a first reference output signal; a first integration circuit; and an analog-to-digital circuit including: a ramp signal generating circuit for generating a ramp signal according to a second reference microbolometer of a third biasing circuit. In the readout circuit, subtracting and amplifying the detection output signal and the first reference output signal are provided by the integrator at an analog domain, while ratio counting is provided by an analog-to-digital converter during analog-to-digital conversion. Furthermore, a column level integrated readout channel utilizes only one reference microbolometer, and the chip level ramp signal generator also utilizes only one reference microbolometer. Therefore, a chip area is further saved, and noise sources are decreased.

13 Claims, 7 Drawing Sheets

$T_{sub1} < T_{sub2}$

$T_{sub1} < T_{sub2}$

READOUT CIRCUIT FOR UNCOOLED INFRARED FOCAL PLANE ARRAY

CROSS REFERENCE OF RELATED APPLICATION

The present invention claims priority under 35 U.S.C. 119 (a-d) to CN 201410008992.2, filed Jan. 9, 2014.

BACKGROUND OF THE PRESENT INVENTION

1. Field of Invention

The present invention relates to a technique field of infrared focal plane arrays, and more particularly to a readout circuit for an uncooled infrared focal plane array.

2. Description of Related Arts

If a microbolometer infrared imaging system, as one kind of thermal infrared detector, is not compensated by special methods, a detection result thereof is associated with the substrate temperature. In practice, infrared detection results are expected to be only associated with the temperature of the object, and independent of other factors.

The thermo-electric cooler (TEC for short) utilized in the conventional uncooled microbolometer infrared imaging system compensates the substrate temperature. However, TEC has a certain volume and power consumption, which limits the application of uncooled infrared focal plane array detector. Therefore, TEC is attempted to be removed. However, in the microbolometer infrared imaging system without TEC, non-ideal effects such as extreme non-uniformity and non-linearity of the focal plane array will be caused by the change of the substrate temperature, thereby affecting a readout result.

Key technologies for solving the non-ideal effects of the uncooled infrared focal plane array detector without TEC are focused on: designing a readout circuit with a function of non-uniformity calibration and substrate temperature compensation. At the meantime, converting the analog signal to digital signal inside the chip and outputting the digital signal is an effective method for ensuring the quality of images.

The conventional readout circuit of the uncooled infrared focal plane array with analog-to-digital function obtains infrared radiation signals by constant voltage bias active microbolometers and reference microbolometers, wherein column level integrated reference microbolometers are added to the circuit for compensating the DC offset. The obtained infrared radiation signals are amplified by an integrator, and then are converted to digital signals by an analog-to-digital converter for being outputted. However, these output digital signals are substrate temperature dependent. To compensate the substrate temperature induced effects, various methods have been developed. The first method is based on the realization of additional correction of output signals in dependence on substrate temperature. The drawback of this method is the dramatic decrease of scene dynamic range. The second method is based on the preliminary heating and bias equalization (PHABEQ). The bias equalization (BEQ) methods are achieved by employing at least two digital-to-analog converters (DAC), one for BEQ and the other one is used to provide offset correction and substrate temperature compensation. As a result, the chip area and power consumption will be increased.

SUMMARY OF THE PRESENT INVENTION

An object of the present invention is to provide a readout circuit for an uncooled infrared focal plane array with high dynamic range, smaller chip area and lower power consumption compared to conventional products.

Another object of the present invention is to provide a readout circuit for an uncooled infrared focal plane array whose substrate temperature compensation can be achieved by the analog-to-digital conversion. Thus less noise is introduced than conventional ways.

Accordingly, in order to accomplish the above objects, the present invention provides a readout circuit for an uncooled infrared focal plane array, comprising:

a first biasing circuit, wherein the first biasing circuit is connected to an active microbolometer unit, the first biasing circuit generates a detection output signal according to an electrical property of the active microbolometer unit;

a second biasing circuit, wherein the second biasing circuit comprises a first reference microbolometer unit, the second biasing circuit generates a first reference output signal according to an electrical property of the first reference microbolometer unit;

a first integration circuit, wherein the first biasing circuit and the second biasing circuit are connected to the first integration circuit, the first integration circuit subtracts the first reference output signal from the detection output signal and amplifies a difference between the detection output signal and the first reference output signal, for generating an integration output signal; and an analog-to-digital circuit, wherein the first integration circuit is connected to the analog-to-digital circuit, the analog-to-digital circuit converts the integration output signal to a digital output signal;

wherein the analog-to-digital circuit comprises a ramp signal generator, wherein the ramp signal generator comprises:

a ramp signal generating circuit; and a third biasing circuit, wherein the third biasing circuit is connected to the ramp signal generating circuit;

wherein the third biasing circuit comprises a second reference microbolometer, the third biasing circuit generates a second reference output signal according to an electrical property of the second reference microbolometer, and sends the second reference output signal to the ramp signal generating circuit;

wherein the ramp signal generating circuit generates a ramp signal according to the second reference output signal.

According to a preferred embodiment of the present invention, the first biasing circuit comprises:

a first constant current source, wherein the first constant current source is connected to a first terminal of the active microbolometer unit; and a first operational amplifier;

wherein the first terminal of the active microbolometer unit, which is connected to the first constant current source, is connected to an in-phase input terminal of the first operational amplifier.

According to the preferred embodiment of the present invention, the second biasing circuit comprises:

a second constant current source, wherein the second constant current source is connected to a first terminal of the first reference microbolometer unit; and a second operational amplifier;

wherein the first terminal of the first reference microbolometer unit, which is connected to the second constant current source, is connected to an in-phase input terminal of the second operational amplifier;

wherein a bias current of the second constant current source equals to a bias current of the first constant current source.

According to the preferred embodiment of the present invention, the third biasing circuit comprises:

a third constant current source, wherein the third constant current source is connected to a first terminal of the second reference microbolometer; and a third operational amplifier;

wherein the first terminal of the second reference microbolometer, which is connected to the third constant current source, is connected to an in-phase input terminal of the third operational amplifier;

wherein a bias current of the third constant current source is less than the bias current of the first constant current source or the bias current of the second constant current source.

According to the preferred embodiment of the present invention, the first integration circuit comprises:

a fourth operational amplifier;

an integration resistor; and an integration capacitor;

wherein the first biasing circuit is connected to a reversed-phase input terminal of the fourth operational amplifier through the integration resistor;

wherein the second biasing circuit is connected to an in-phase input terminal of the fourth operational amplifier;

wherein the reversed-phase input terminal of the fourth operational amplifier is connected to an output terminal of the fourth operational amplifier through the integration capacitor.

According to the preferred embodiment of the present invention, the ramp signal generating circuit comprises:

a current mirror circuit; and a second integration circuit;

wherein the third biasing circuit is connected to the current mirror circuit, the current mirror circuit is connected to the second integration circuit.

According to the preferred embodiment of the present invention, the analog-to-digital circuit further comprises:

a comparator, wherein the first integration circuit is connected to a first input terminal of the comparator, the ramp signal generator is connected to a second input terminal of the comparator;

a counter; and a register group, wherein an output terminal of the comparator and an output terminal of the counter are connected to the register group;

wherein the comparator compares the integration output signal with the ramp signal;

wherein the register group generates a digital output signal according to a comparison result of the integration output signal and the ramp signal as well as a counting result.

According to the preferred embodiment of the present invention, the counter is a double edge Gray code counter.

In the readout circuit according to the preferred embodiment of the present invention, subtracting and amplifying the difference between the detection output signal and the first reference output signal are provided by the integrator at an analog domain, while ratio counting is provided by an analog-to-digital converter during analog-to-digital converting. Furthermore, a column level integrated readout channel utilizes only one reference microbolometer, and the chip level ramp signal generator also utilizes only one reference microbolometer. Therefore, a chip area is further saved, and noise sources are decreased.

These and other objectives, features, and advantages of the present invention will become apparent from the following detailed description, the accompanying drawings, and the appended claims.

DETAILED DESCRIPTION OF THE PREFERRED EMBODIMENT

Referring to the drawings, a readout circuit for an uncooled infrared focal plane array according to a preferred embodiment of the present invention is illustrated.

Figure 1:
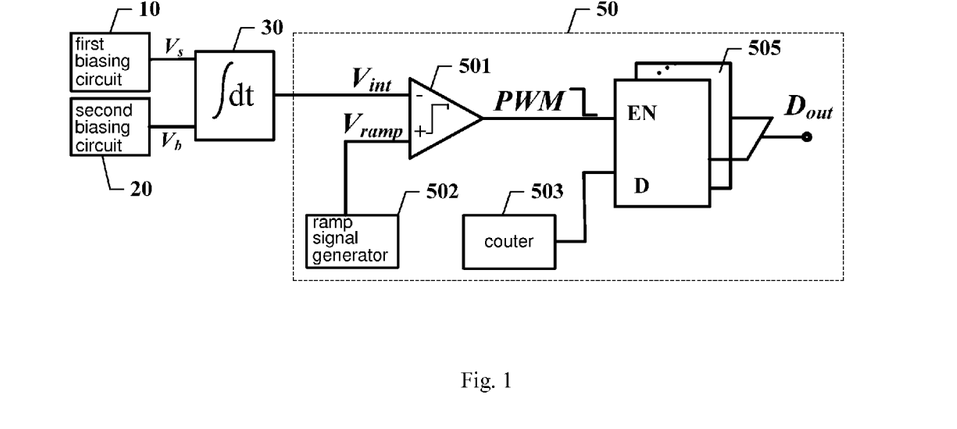
FIG. 1 is a schematic view of a readout circuit for an uncooled infrared focal plane array according to a preferred embodiment of the present invention.

FIG. 1 is a schematic view of a readout circuit for an uncooled infrared focal plane array according to the preferred embodiment of the present invention.

Referring to the FIG. 1 of the drawings, a readout circuit for an uncooled infrared focal plane array according to the preferred embodiment of the present invention is illustrated, comprising:

a first biasing circuit 10;

a second biasing circuit 20;

a first integration circuit 30; and an analog-to-digital circuit 50.

According to the preferred embodiment, the first biasing circuit 10 is connected to an active microbolometer unit. Usually, a plurality of the active microbolometer units is provided in the uncooled infrared focal plane array, and is arranged in a form of array for detecting incident infrared radiation. According to the preferred embodiment of the present invention, each of the first biasing circuit 10 is connected to a column (or row) of the active microbolometer array. For example, each column (or row) of the active microbolometer unit is correspondingly provided with the first biasing circuit 10. Therefore, according to the preferred embodiment of the present invention, the readout circuit comprises a plurality of the first biasing circuits 10, and a number of the first biasing circuit 10 equals to a number of the column (or row) of the active microbolometer unit in the active microbolometer array.

Figure 2:
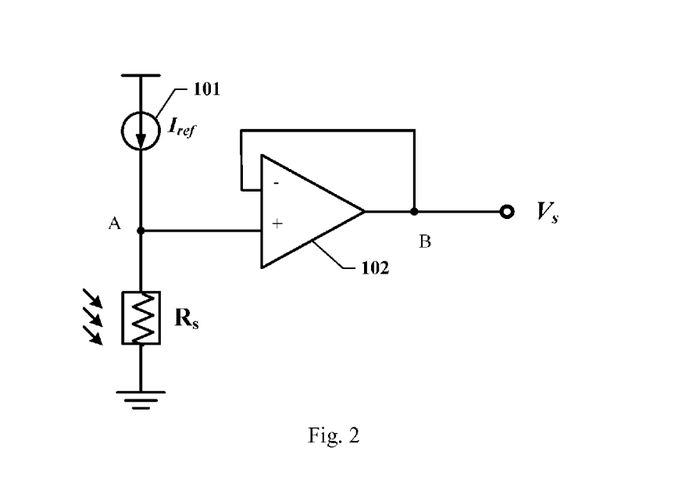
FIG. 2 is a schematic view of a first biasing circuit according to the preferred embodiment of the present invention.

According to the preferred embodiment, the first biasing circuit 10 is connected to an active microbolometer unit, and generates a detection output signal according to an electrical property of the active microbolometer unit According to the preferred embodiment, a structure of the first biasing circuit 10 is illustrated in the FIG. 2, wherein the first biasing circuit 10 comprises:

a first constant current source 101; and a first operational amplifier 102;

wherein the first constant current source 101 is connected to a first terminal (which is illustrated with A) of the active microbolometer unit (which is schematically illustrated with $R_s$), and the first terminal (which is illustrated with A) of the active microbolometer unit, which is connected to the first constant current source 101, is connected to an in-phase input terminal of the first operational amplifier 102.

According to the preferred embodiment, a reversed-phase input terminal of the first operational amplifier 102 is connected to an output terminal (which is illustrated with B) of the first operational amplifier 102.

During operation, the infrared radiation is obtained by the active microbolometer, which leads to temperature change of the active microbolometer unit, thereby changing the electrical property (for example, an equivalent resistance $R_s$ of the active microbolometer unit) of the active microbolometer unit, in such a manner that the detection output signal (for example, an output voltage $V_s$) generated by the first biasing circuit 10 according to the electrical property of the active microbolometer unit (for example, the equivalent resistance $R_s$ thereof) is changed.

Furthermore, when a substrate temperature of the infrared focal plane array is changed, the electrical property of the active microbolometer unit (for example, the equivalent resistance $R_s$ thereof) is changed, in such a manner that the detection output signal (for example, an output voltage $V_s$) is changed.

For example, according to the preferred embodiment, in the first biasing circuit 10, a bias current $I_{ref}$ provided by the first constant current source 101 is bias to a constant current of the active microbolometer unit, and the first operational amplifier 102 obtains a voltage at the node A as the output $V_s$. The output $V_s$ is determined by the bias current $I_{ref}$ together with the equivalent resistance $R_s$ of the active microbolometer unit. The equivalent resistance $R_s$ of the active microbolometer unit is associated with the substrate temperature.

Figure 3:
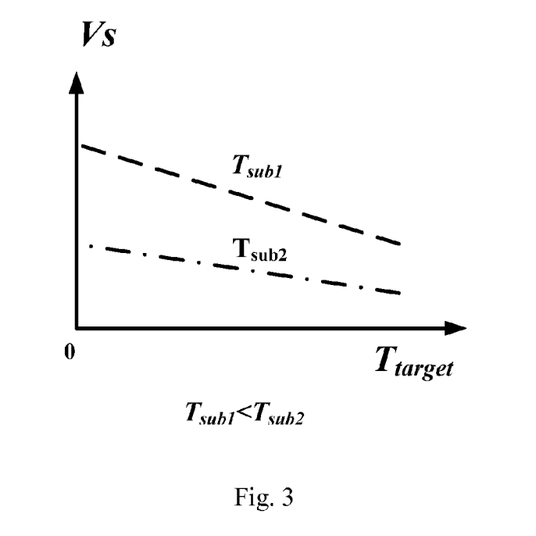
FIG. 3 is a relationship curve of an output signal of the first biasing circuit and an object temperature under different substrate temperatures according to the preferred embodiment of the present invention.

According to the preferred embodiment, a relationship curve of the output $V_s$ of the first biasing circuit 10, an object temperature $T_{target}$ and the substrate temperature ($T_{sub1}$ and $T_{sub2}$) is illustrated in the FIG. 3. According to the FIG. 3, on the one hand, the voltage $V_s$ decreases when the infrared object temperature increases and vice versa; On the other hand the voltage $V_s$ decreases when the substrate temperature increases.

According to the preferred embodiment, the second biasing circuit 20 is corresponding to the first biasing circuit 10 and/or the column (or row) of the active microbolometer unit; for example, each column (or row) of the active microbolometer unit and/or the first biasing circuit 10 are correspondingly provided with the second biasing circuit 20. Therefore, according to the preferred embodiment of the present invention, the readout circuit comprises a plurality of the second biasing circuits 20, and a number of the first biasing circuit 10 equals to a number of the column (or row) of the active microbolometer unit in the active microbolometer array. Furthermore, according to the preferred embodiment of the present invention, each of the second biasing circuit 20 comprises a first reference microbolometer unit (illustrated as follows).

According to the preferred embodiment, the second biasing circuit 20 is integrated with a same form of the first biasing circuit 10. For example, if the first biasing circuit 10 is column-integrated, the second biasing circuit 20 is column-integrated; if the first biasing circuit 10 is row-integrated, the second biasing circuit 20 is row-integrated.

Figure 4:
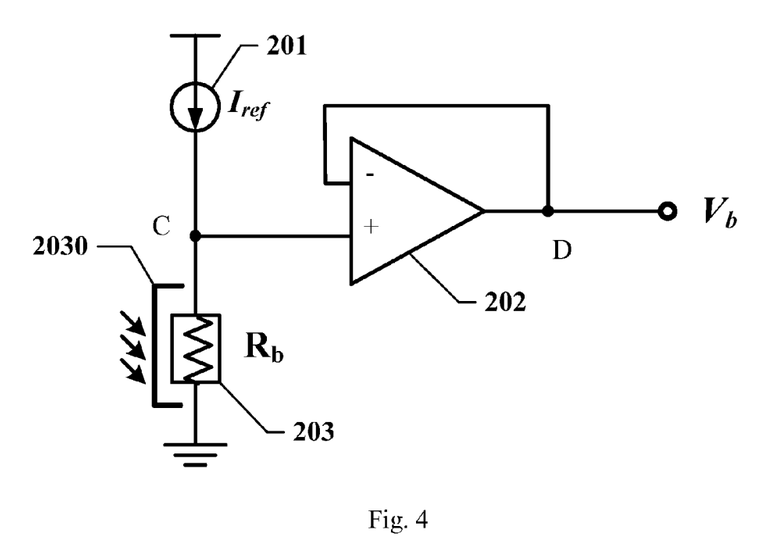
FIG. 4 is a schematic view of a second biasing circuit according to the preferred embodiment of the present invention.

According to the preferred embodiment, a structure of the second biasing circuit 20 is illustrated in the FIG. 4, comprising:

a second constant current source 201;

a second operational amplifier 202; and the first reference microbolometer unit 203.

According to the preferred embodiment, the second biasing circuit 20 comprises the first reference microbolometer unit 203, and generates a first reference output signal (for example, an output voltage $V_b$) according to an electrical property of the first reference microbolometer unit 203. As mentioned above, according to the preferred embodiment of the present invention, the readout circuit comprises a plurality of the second biasing circuits 20. Therefore, correspondingly, the readout circuit comprises a plurality of the first reference microbolometer units 203.

According to the preferred embodiment of the present invention, the first reference microbolometer unit 203 is not affected by the incident infrared radiation, that is to say, the first reference microbolometer unit 203 has no effect on the incident infrared radiation during operation. For example, according to the preferred embodiment, the first reference microbolometer unit 203 comprises a reflecting layer 2030, wherein during operation, the reflecting layer 2030 keeps the incident infrared radiation out in such a manner that the incident infrared radiation is not able to reach the first reference microbolometer unit 203. According to the preferred embodiment of the present invention, the first reference microbolometer unit 203 has a same structure as the active microbolometer unit except for the reflecting layer 2030.

However, although the first reference microbolometer unit 203 is not affected by the incident infrared radiation, an electric property thereof (for example, an equivalent resistance $R_b$) is affected by the substrate temperature of the infrared focal panel array.

For example, according to the preferred embodiment, in the second biasing circuit 20, a bias current $I_{ref}$ provided by the second constant current source 201 is bias to a constant current of the first reference microbolometer unit, and the second operational amplifier 202 obtains a voltage at a node C as the output $V_b$. The output $V_b$ is determined by the bias current $I_{ref}$ together with the equivalent resistance $R_b$ of the first reference microbolometer unit 203. The equivalent resistance $R_b$ of the first reference microbolometer unit 203 is associated with the substrate temperature.

According to the preferred embodiment of the present invention, the bias current of the second constant current source 201 equals to the bias current of the first constant current source 101, in value.

Figure 5:
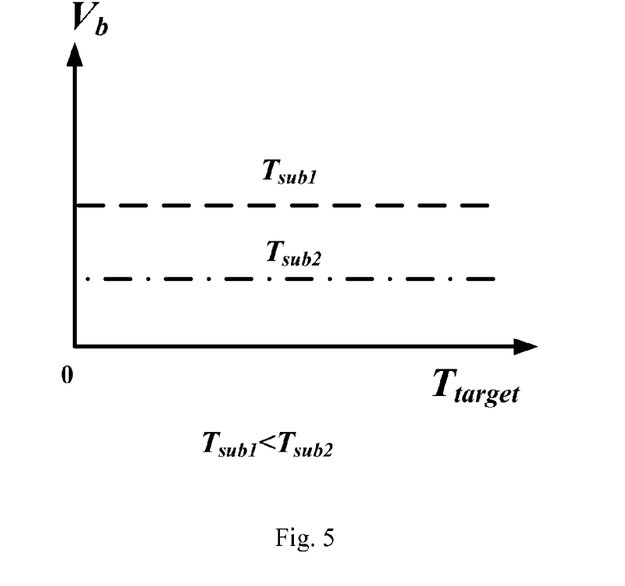
FIG. 5 is a relationship curve of an output signal of the second biasing circuit and the object temperature under different substrate temperatures according to the preferred embodiment of the present invention.

According to the preferred embodiment, a relationship curve of the output $V_b$ of the second biasing circuit 20, the object temperature $T_{target}$ and the substrate temperature ($T_{sub1}$ and $T_{sub2}$) is illustrated in the FIG. 5. According to the FIG. 5, the voltage $V_b$ maintains when the infrared object temperature changes. However the voltage $V_b$ decreases when the substrate temperature increases and vice versa.

According to the preferred embodiment of the present invention, the second constant current source 201 is connected to a first terminal (which is illustrated with C) of the first reference microbolometer unit 203, and the first terminal (which is illustrated with C) of the first reference microbolometer unit 203, which is connected to the second constant current source 201, is connected to an in-phase input terminal of the second operational amplifier 202.

According to the preferred embodiment, a reversed-phase input terminal of the second operational amplifier 202 is connected to an output terminal (which is illustrated with D) of the second operational amplifier 202.

According to the preferred embodiment of the present invention, the first biasing circuit 10 and the second biasing circuit 20 are connected to the first integration circuit 30, the first integration circuit 30 subtracts the first reference output signal of the first biasing circuit 20 from the detection output signal of the second biasing circuit 10 and amplifies a difference of the detection output signal and the first reference output signal, for generating an integration output signal (for example, $V_{int}$).

Figure 6:
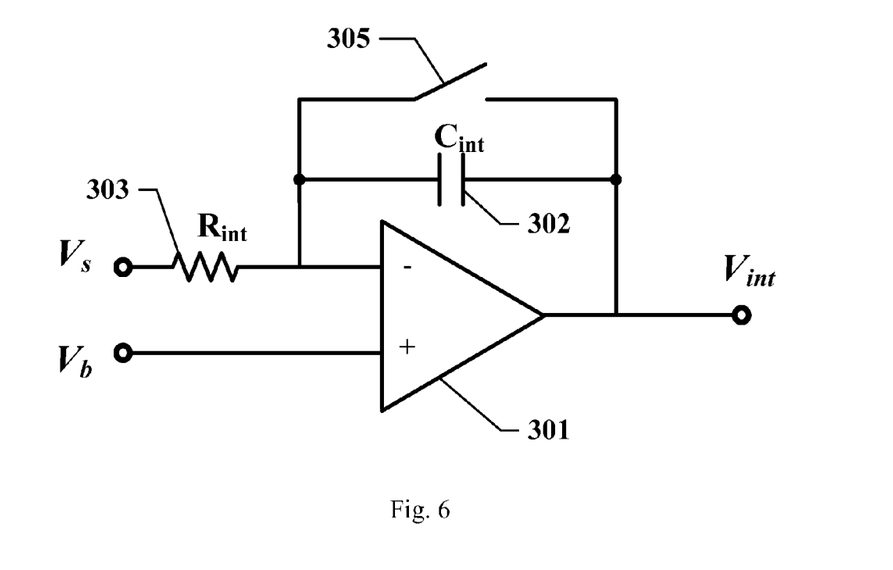
FIG. 6 is a schematic view of an integration circuit according to the preferred embodiment of the present invention.

According to the preferred embodiment, a structure of the first integration circuit 30 is illustrated in the FIG. 6, wherein the first integration circuit 30 comprises:
a fourth operational amplifier 301;
an integration capacitor 302; and
an integration resistor 303.

According to the preferred embodiment, the first biasing circuit 10 is connected to a reversed-phase input terminal of the fourth operational amplifier 301 through the integration resistor 303; the second biasing circuit 20 is connected to an in-phase input terminal of the fourth operational amplifier 301; the reversed-phase input terminal of the fourth operational amplifier 301 is connected to an output terminal of the fourth operational amplifier 301 through the integration capacitor 302.

Furthermore, the first integration circuit 30 correspondingly comprises a timing switch 305, wherein the timing switch 305 is connected between the reversed-phase input terminal and the output terminal of the fourth operational amplifier 301. That is to say, the timing switch 305 is connected to the integration capacitor 303 in parallel.

In the first integration circuit 30, the $V_b$ is an initial value, integration is provided according to difference of the $V_b$ and the $V_s$. The signal $V_{int}$ obtained by the first integration circuit 30 is associated with the substrate temperature.

Figure 7:
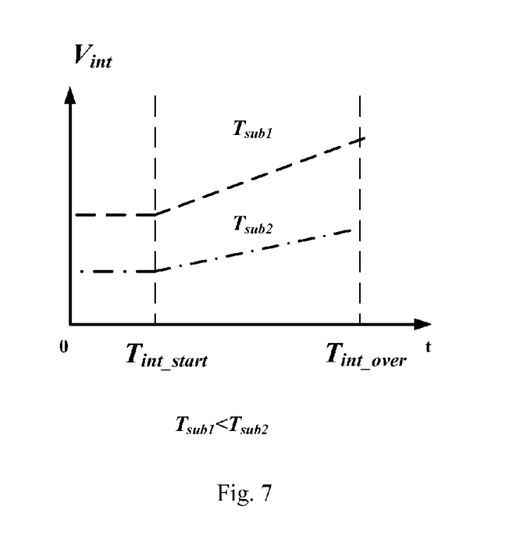
FIG. 7 is a relationship curve of an output signal of the integration circuit and an integration time under different substrate temperatures according to the preferred embodiment of the present invention.

Referring to the FIG. 7 of the drawings, a relationship curve of the integration output signal $V_{int}$ and an integration time is illustrated. A reset time of an integrator is from 0 to $T_{int\_start}$. During the reset time, the output of the integrator is reset to a value of the in-phase input terminal, which is the $V_b$. An integration time of the integrator is from the $T_{int\_start}$ to $T_{int\_over}$. During the integration time, the difference of the $V_b$ and the $V_s$ is integrated from the initial value. Two curves are integration curves with same infrared radiation and different substrate temperatures ($T_{sub1}$ and $T_{sub2}$), wherein the $T_{sub1}$<$T_{sub2}$. Therefore, the integration output is lower when the substrate temperature is higher, and higher when the substrate temperature is lower.

Referring to the FIG. 1 of the drawings, the first integration circuit 30 is connected to the analog-to-digital circuit 50. The analog-to-digital circuit 50 converts the integration output signal of the first integration circuit 30 to a digital output signal.

The analog-to-digital circuit 50 comprises:
a comparator 501;
a ramp signal generator 502;
a counter 503; and
a register group 505, wherein;
wherein the first integration circuit 30 is connected to a first input terminal of the comparator 501, the ramp signal generator 502 is connected to a second input terminal of the comparator 501; an output terminal of the comparator 501 and an output terminal of the counter 503 are connected to the register group 505.

According to the preferred embodiment of the present invention, in the analog-to-digital circuit 50, the comparator 501 and the register group 505 are column-level-integrated, and the ramp signal generator 502 is chip-level-integrated.

The comparator 501 compares the integration output signal $V_{int}$ outputted by the first integration circuit 30 with the ramp signal $V_{ramp}$ outputted by the ramp signal generator 502, and outputs a comparison result PWM to the register group 505. The register group 505 generates a digital output signal $D_{out}$ according to the comparison result PWM of the integration output signal $V_{int}$ and the ramp signal $V_{ramp}$ as well as a counting result of the counter 503.

According to the preferred embodiment of the present invention, the counter 503 is a double edge Gray code counter. Utilization of the double edge Gray code counter is able to lower an operation rate, so as to lower circuit design pressure.

Figure 8:
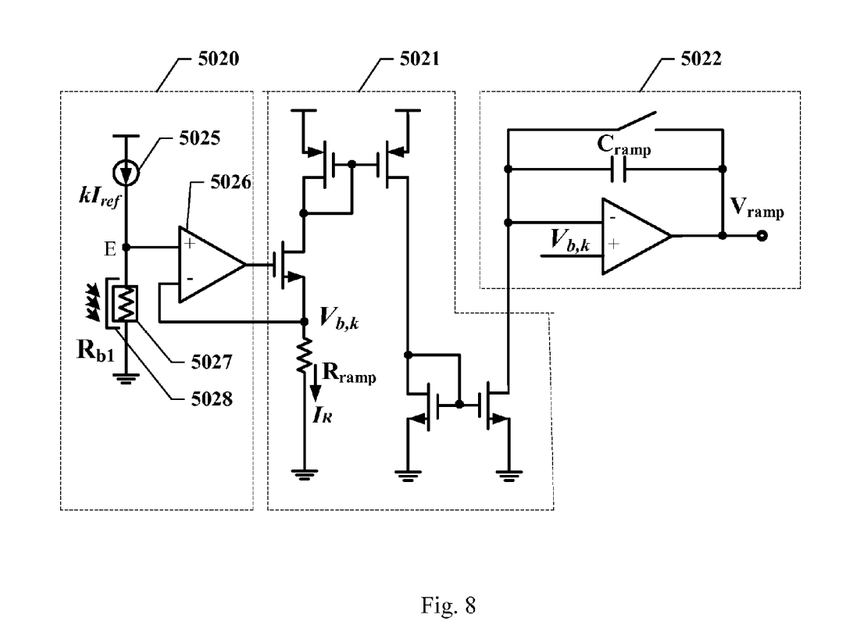
FIG. 8 is a schematic view of a ramp signal generator according to the preferred embodiment of the present invention.

According to the preferred embodiment, a structure of the ramp signal generator 502 is illustrated in the FIG. 8. The ramp signal generator 502 comprises:
a third biasing circuit 5020; and
a ramp signal generating circuit;
wherein the third biasing circuit 5020 is connected to the ramp signal generating circuit;
wherein the ramp signal generating circuit comprises:
a current mirror circuit 5021; and
a second integration circuit 5022;
wherein the third biasing circuit 5020 is connected to the current mirror circuit 5021, the current mirror circuit 5021 is connected to the second integration circuit 5022.

Referring to the FIG. 8 of the drawings, according to the preferred embodiment, the third biasing circuit 5020 comprises:
a third constant current source 5025;
a third operational amplifier 5026; and
a second reference microbolometer 5027.

According to the preferred embodiment of the present, the third biasing circuit 5020 comprises the second reference microbolometer 5027, the third biasing circuit 5020 generates a second reference output signal according to an electrical property of the second reference microbolometer 5027.

According to the preferred embodiment of the present invention, the ramp signal generator 502 is chip-level-integrated rather than column-level-integrated (or row-level-integrated). That is to say, the ramp signal generator 502 is corresponding to a plurality of the columns (or rows) of the active microbolometer unit. For example, each the analog-to-digital circuit 50 is correspondingly provided with the first biasing circuit 10 and the second biasing circuit 20. Therefore, correspondingly, for a plurality of the first biasing circuit 10 and the second biasing circuit 20, only one corresponding second reference microbolometer 5027 is needed.

According to the preferred embodiment of the present invention, the second reference microbolometer 5027 is not affected by the incident infrared radiation, that is to say, the second reference microbolometer 5027 has no effect on the incident infrared radiation during operation. For example, according to the preferred embodiment, the second reference microbolometer 5027 comprises a reflecting layer 5028, wherein during operation, the reflecting layer 5028 keeps the incident infrared radiation out in such a manner that the incident infrared radiation is not able to reach the second reference microbolometer 5027. According to the preferred embodiment of the present invention, the second reference microbolometer 5027 has a same structure as the active microbolometer unit except for the reflecting layer 5028.

However, although the second reference microbolometer 5027 is not affected by the incident infrared radiation, an electric property thereof (for example, an equivalent resistance $R_{b1}$) is affected by the substrate temperature of the infrared focal panel array.

For example, according to the preferred embodiment, in the third biasing circuit 5020, the third constant current source 5025 provides a bias current $kI_{ref}$, wherein $0<k\leq1$. The k is a predetermined constant, which is determined according to requirements. The bias current $kI_{ref}$ is bias to a constant current of the second reference microbolometer 5027, and the third operational amplifier 5026 obtains a voltage at a node E as the second reference output signal. The output voltage is determined by the bias current $kI_{ref}$ together with the equivalent resistance $R_{b1}$ of the second reference microbolometer 5027. The equivalent resistance $R_{b1}$ of the second reference microbolometer 5027 is associated with the substrate temperature. Therefore, the second reference output signal is associated with the substrate temperature.

According to the preferred embodiment of the present invention, the third constant current source 5025 is connected to a first terminal (which is illustrated with E) of the second reference microbolometer 5027; and the first terminal (which is illustrated with E) of the second reference microbolometer 5027, which is connected to the third constant current source 5025, is connected to an in-phase input terminal of the third operational amplifier 5026.

According to the preferred embodiment of the present invention, the bias current of the third constant current source 5025 is less than the bias current of the first constant current source 101 or the bias current of the second constant current source 201.

According to the preferred embodiment, the ramp signal generation circuit (for example, the current mirror circuit 5021 and the second integration circuit 5022) generates the ramp signal $V_{ramp}$ according to the second reference signal generated by the third biasing circuit 5020. As mentioned above, the second reference output signal of the third biasing circuit 5020 is associated with the substrate temperature. Therefore, the ramp signal $V_{ramp}$ is associated with the substrate temperature.

Figure 9:
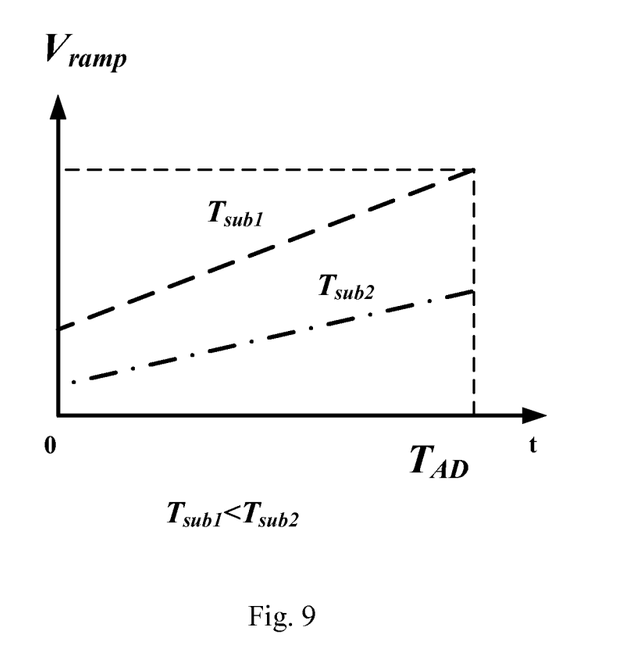
FIG. 9 is a relationship curve of a ramp signal outputted by the ramp signal generator and an analog-to-digital converting time under different substrate temperatures according to the preferred embodiment of the present invention.

According to the preferred embodiment, a relationship curve of the output $V_{ramp}$ of the ramp signal generator 502, an analog-to-digital conversion time $T_{AD}$ and the substrate temperature ($T_{sub1}$ and $T_{sub2}$) is illustrated in the FIG. 9.

Therefore, referring to the FIG. 8 and the FIG. 9 of the drawing, according to the preferred embodiment, the constant current is bias to the second reference microbolometer, but the bias current, which is $kI_{ref}$ ($0<k\leq1$) is different from the bias currents of the first biasing circuit 10 and the second biasing circuit 20. The third operational amplifier 5026 obtains $kV_b$, and generates a current $I_R$ on the ramp circuit resistor $R_{ramp}$. According to the generation method of the $I_R$, the $I_R$ is associated with the substrate temperature. The integrator in the ramp signal generator 502 integrates a mirror current of the $I_R$ according to the $kV_b$, and an integration result is the ramp signal $V_{ramp}$. Referring to the drawings, it is illustrated that the $V_{ramp}$ is associated with the substrate temperature.

Referring to the FIG. 9 of the drawings, a relationship of the $V_{ramp}$ outputted by the ramp signal generator 502 and the analog-to-digital conversion time $T_{AD}$ is illustrated. The two curves are $V_{ramp}$ curves under the same infrared radiation and different substrate temperatures, wherein the $T_{sub1}<T_{sub2}$. Therefore, the integration output is lower when the substrate temperature is higher, and higher when the substrate temperature is lower. A relationship thereof has a same trend as the relationship of the output $V_{int}$ of the first integration circuit 30 and the substrate temperature.

According to the preferred embodiment of the present invention, by taking advantage of that the relationship of the $V_{int}$ and the substrate temperature has the same trend as the relationship of the $V_{ramp}$ and the substrate temperature, substrate temperature compensation is completed during the analog-to-digital conversion. The analog-to-digital circuit 50 (which forms a single slope analog-to-digital convertor) according to the preferred embodiment of the present invention essentially calculates a ratio of the $V_{int}$ and the $V_{ramp}$, and substrate temperature factors are eliminated after calculating. Therefore, the ratio is not associated with the substrate temperature.

Figure 10:
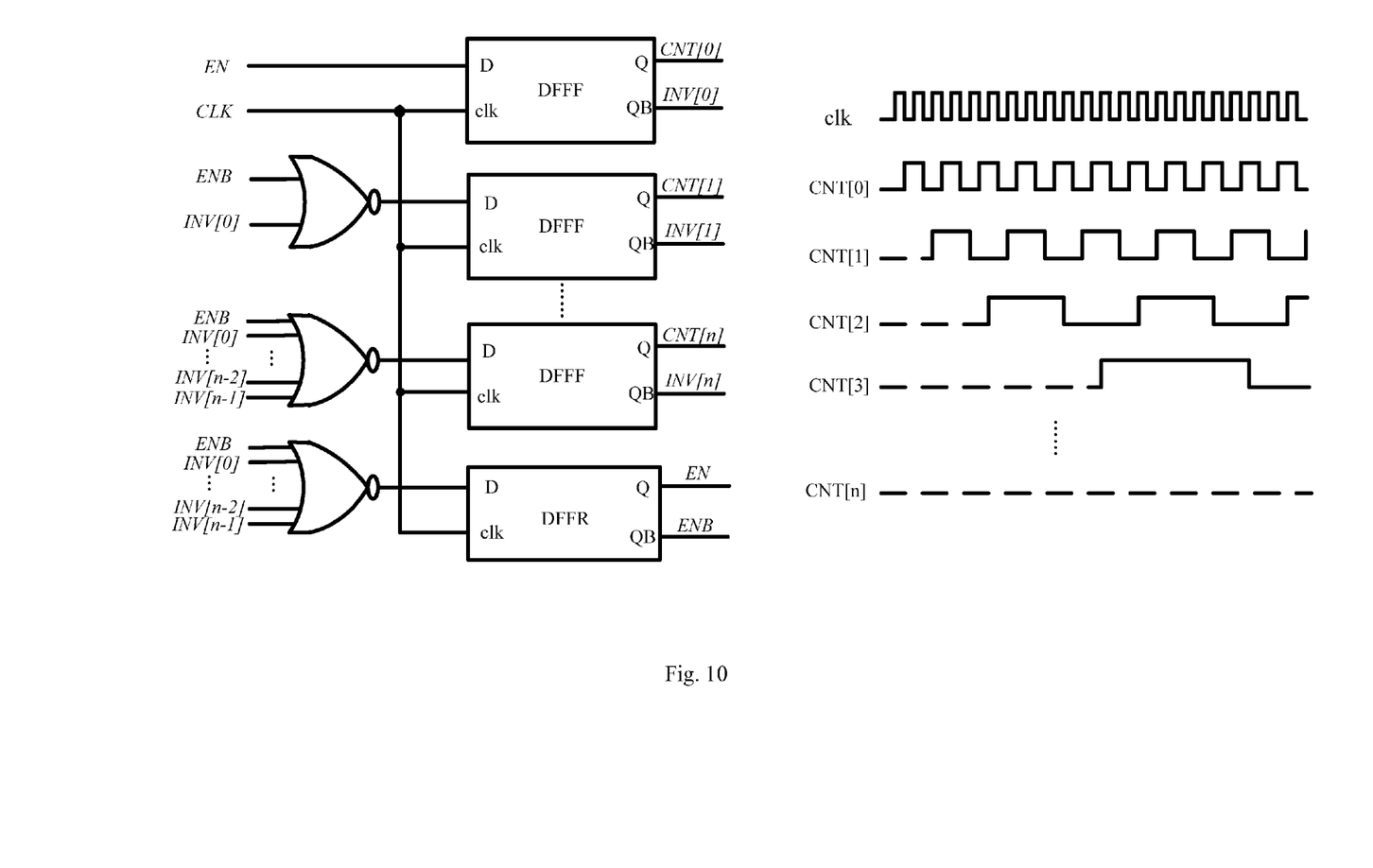
FIG. 10 is a schematic view of a double edge Gray code counter according to the preferred embodiment of the present invention.

As mentioned above, according to the preferred embodiment of the present invention, the counter 503 is the double edge Gray code counter. The FIG. 10 is a schematic and timing view of the double edge Gray code counter in the FIG. 1. The double edge Gray code counter utilizes two kinds of triggers, which are a rising edge trigger and a falling edge trigger. The counter counts when a clock is at a rising edge and a falling edge, that is to say, the counter counts twice during a clock cycle. The Gray code counter effectively decreases an error rate of the analog-to-digital convertor. At the meantime, by utilizing the double edge Gray code counter, an operation rate is decreased, in such a manner that circuit design pressure is decreased.

Figure 11:
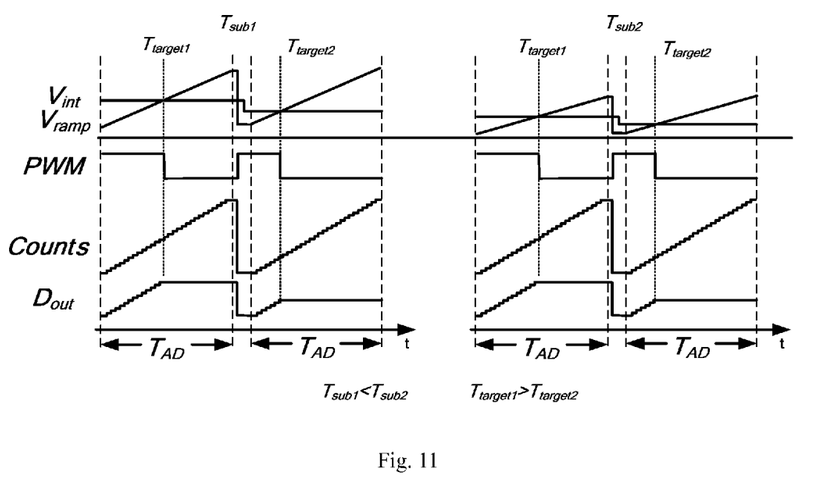
FIG. 11 is a timing diagram of analog-to-digital conversion according to the preferred embodiment of the present invention.

Referring to the FIG. 11 of the drawings, a timing diagram of the analog-to-digital conversion according to the preferred embodiment of the present invention is illustrated, wherein the $V_{int}$ is the integration result, the $V_{ramp}$ is the output of the ramp signal generator, and the PWM is the comparison result of the comparator. The PWM is changed from a high level to a low level when the $V_{int}$ is just lower than the $V_{ramp}$, and the PWM is kept at the low level in an analog-to-digital conversion cycle for controlling the register group recording and keeping the counter counting. Counts is a counting results of the counter, which continuously increases during the analog-to-digital conversion and is not affected by the PWM. $D_{out}$ is a recorded counting result of the register group. When the PWM is at the high level, the $D_{out}$ is associated with the Counts; When the PWM is changed from the high level to the low level, the $D_{out}$ is no longer associated with the Counts but records the present Counts. Then the PWM is kept at the low level, and as a result, the $D_{out}$ is not changed.

A relationship between the substrate temperature and the object temperature is illustrated as: $T_{sub1}<T_{sub2}$, $T_{target1}>T_{target2}$. An initial value of the $V_{ramp}$ of the ramp signal generator under the $T_{sub1}$ is high, and a slope thereof is large (a ratio of the $T_{sub2}$ and the $V_{ramp}$). The integration result $V_{int}$ is higher under the $T_{target1}$ than under the $T_{target2}$, and both are higher than the $V_{int}$ under the $T_{sub2}$. However, under the two substrate temperatures, the digital outputs $D_{out}$ are the same with the same object temperature.

The comparator and the register group are column-level-integrated. Therefore, when the PWM of the row is changed to the low level, other columns of the register group is not affected; that is to say, the analog-to-digital conversion of different columns in the same row is completed within one analog-to digital conversion cycle.

According to the present invention, the radiation signal is obtained by a microbolometer branch in a constant and bias form. Subtracting and amplifying the detection output signal and the first reference output signal are provided by the integrator at an analog domain, while the ratio counting is provided by the analog-to-digital converter (for example, the single slope analog-to-digital converter) during analog-to-digital conversion. The analog-to-digital conversion is one part of and is more closely associated with the infrared detection. At the meantime, a column-level-integrated readout channel utilizes only one reference microbolometer, and the chip level ramp signal generator also utilizes only one reference microbolometer. Therefore, a chip area is further saved, and noise sources are decreased. Furthermore, by utilizing the double edge Gray code counter, the operation rate is decreased, in such a manner that the circuit design pressure is decreased.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A readout circuit for an uncooled infrared focal plane array, comprising:
   a first biasing circuit, wherein said first biasing circuit is connected to an active microbolometer unit, said first biasing circuit generates a detection output signal according to an electrical property of said active microbolometer unit;
   a second biasing circuit, wherein said second biasing circuit comprises a first reference microbolometer unit, said second biasing circuit generates a first reference output signal according to an electrical property of said first reference microbolometer unit;
   a first integration circuit, wherein said first biasing circuit and said second biasing circuit are connected to said first integration circuit, said first integration circuit subtracts said first reference output signal from said detection output signal and amplifies a difference of said detection output signal and said first reference output signal, for generating an integration output signal; and
   an analog-to-digital circuit, wherein said first integration circuit is connected to said analog-to-digital circuit, said analog-to-digital circuit converts said integration output signal to a digital output signal;
   wherein said analog-to-digital circuit comprises a ramp signal generator, wherein said ramp signal generator comprises:
   a ramp signal generating circuit; and
   a third biasing circuit, wherein said third biasing circuit is connected to said ramp signal generating circuit;
   wherein said third biasing circuit comprises a second reference microbolometer, said third biasing circuit generates a second reference output signal according to an electrical property of said second reference microbolometer, and sends said second reference output signal to said ramp signal generating circuit;
   wherein said ramp signal generating circuit generates a ramp signal according to said second reference output signal.

2. The readout circuit, as recited in claim 1, wherein said first biasing circuit comprises:
   a first constant current source, wherein said first constant current source is connected to a first terminal of said active microbolometer unit; and
   a first operational amplifier;
   wherein said first terminal of said active microbolometer unit, which is connected to said first constant current source, is connected to an in-phase input terminal of said first operational amplifier.

3. The readout circuit, as recited in claim 2, wherein said second biasing circuit comprises:
   a second constant current source, wherein said second constant current source is connected to a first terminal of said first reference microbolometer unit; and
   a second operational amplifier;
   wherein said first terminal of said first reference microbolometer unit, which is connected to said second constant current source, is connected to an in-phase input terminal of said second operational amplifier;
   wherein a bias current of said second constant current source equals to a bias current of said first constant current source.

4. The readout circuit, as recited in claim 3, wherein said third biasing circuit comprises:
   a third constant current source, wherein said third constant current source is connected to a first terminal of said second reference microbolometer; and
   a third operational amplifier;
   wherein said first terminal of said second reference microbolometer, which is connected to said third constant current source, is connected to an in-phase input terminal of said third operational amplifier;
   wherein a bias current of said third constant current source is less than said bias current of said first constant current source or said bias current of said second constant current source.

5. The readout circuit, as recited in claim 1, wherein said first integration circuit comprises:
   a fourth operational amplifier;
   an integration resistor; and
   an integration capacitor;
   wherein said first biasing circuit is connected to a reversed-phase input terminal of said fourth operational amplifier through said integration resistor;
   wherein said second biasing circuit is connected to an in-phase input terminal of said fourth operational amplifier;
   wherein said reversed-phase input terminal of said fourth operational amplifier is connected to an output terminal of said fourth operational amplifier through said integration capacitor.

6. The readout circuit, as recited in claim 2, wherein said first integration circuit comprises:
   a fourth operational amplifier;
   an integration resistor; and
   an integration capacitor;
   wherein said first biasing circuit is connected to a reversed-phase input terminal of said fourth operational amplifier through said integration resistor;
   wherein said second biasing circuit is connected to an in-phase input terminal of said fourth operational amplifier;

wherein said reversed-phase input terminal of said fourth operational amplifier is connected to an output terminal of said fourth operational amplifier through said integration capacitor.

7. The readout circuit, as recited in claim 3, wherein said first integration circuit comprises:
   a fourth operational amplifier;
   an integration resistor; and
   an integration capacitor;
   wherein said first biasing circuit is connected to a reversed-phase input terminal of said fourth operational amplifier through said integration resistor;
   wherein said second biasing circuit is connected to an in-phase input terminal of said fourth operational amplifier;
   wherein said reversed-phase input terminal of said fourth operational amplifier is connected to an output terminal of said fourth operational amplifier through said integration capacitor.

8. The readout circuit, as recited in claim 4, wherein said first integration circuit comprises:
   a fourth operational amplifier;
   an integration resistor; and
   an integration capacitor;
   wherein said first biasing circuit is connected to a reversed-phase input terminal of said fourth operational amplifier through said integration resistor;
   wherein said second biasing circuit is connected to an in-phase input terminal of said fourth operational amplifier;
   wherein said reversed-phase input terminal of said fourth operational amplifier is connected to an output terminal of said fourth operational amplifier through said integration capacitor.

9. The readout circuit, as recited in claim 1, wherein said ramp signal generating circuit comprises:
   a current mirror circuit; and
   a second integration circuit;
   wherein said third biasing circuit is connected to said current mirror circuit, said current mirror circuit is connected to said second integration circuit.

10. The readout circuit, as recited in claim 1, wherein said analog-to-digital circuit further comprises:
    a comparator, wherein said first integration circuit is connected to a first input terminal of said comparator, said ramp signal generator is connected to a second input terminal of said comparator;
    a counter; and
    a register group, wherein an output terminal of said comparator and an output terminal of said counter are connected to said register group;
    wherein said comparator compares said integration output signal with said ramp signal;
    wherein said register group generates a digital output signal according to a comparison result of said integration output signal and said ramp signal as well as a counting result.

11. The readout circuit, as recited in claim 9, wherein said analog-to-digital circuit further comprises:
    a comparator, wherein said first integration circuit is connected to a first input terminal of said comparator, said ramp signal generator is connected to a second input terminal of said comparator;
    a counter; and
    a register group, wherein an output terminal of said comparator and an output terminal of said counter are connected to said register group;
    wherein said comparator compares said integration output signal with said ramp signal;
    wherein said register group generates a digital output signal according to a comparison result of said integration output signal and said ramp signal as well as a counting result.

12. The readout circuit, as recited in claim 10, wherein said counter is a double edge Gray code counter.

13. The readout circuit, as recited in claim 11, wherein said counter is a double edge Gray code counter.

* * * * *